Aug. 27, 1946.  J. B. COOPER  2,406,587
ELECTRICAL SWITCH AND OUTLET BOX MOUNTING
Filed May 10, 1944
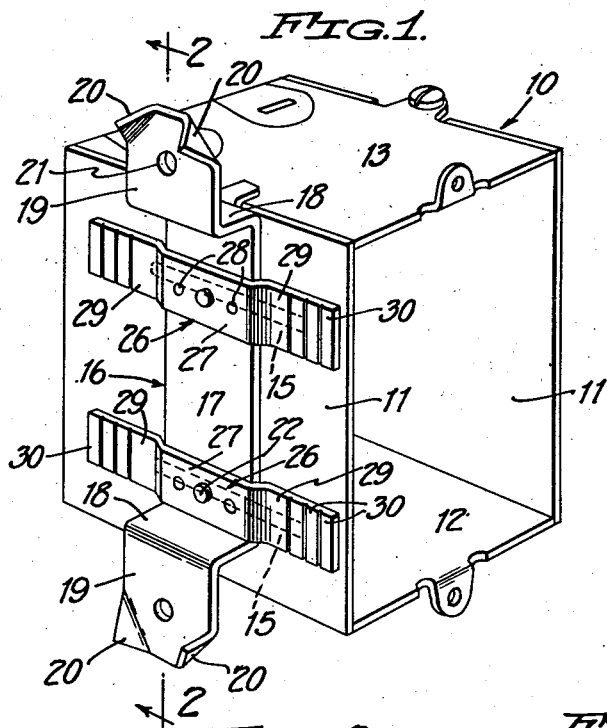
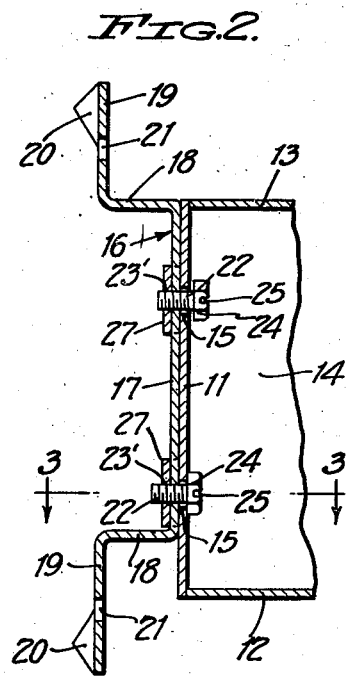
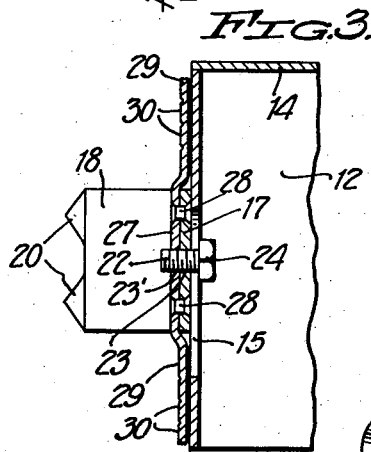
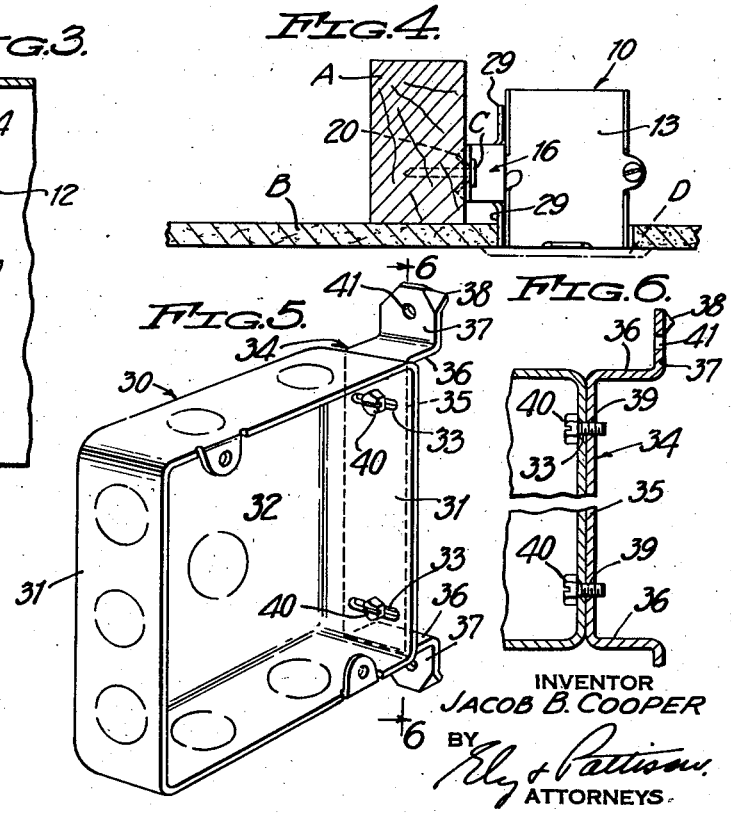
INVENTOR
JACOB B. COOPER
BY
ATTORNEYS Patented Aug. 27, 1946

2,406,587

UNITED STATES PATENT OFFICE 2,406,587

ELECTRICAL SWITCH AND OUTLET BOX MOUNTING

Jacob B. Cooper, Park Ridge, N. J.

Application May 10, 1944, Serial No. 534,852

3 Claims. (Cl. 220—3.9)

This invention relates to improvements in electrical switch and outlet boxes and more especifically to mountings therefor.

When wiring a new building structure for electricity, it is the practice of the electrican to mount the various wall switch boxes and outlet boxes in their respective positions prior to the application of plaster, plaster board, or other thickness of finishing material to a wall or ceiling. It is desired that the front face of the box be flush with the wall or ceiling finishing material, therefore it is difficult to correctly estimate the distance that the box should project from its support, with the result that when the building of a wall or ceiling is finished, the box may extend beyond the surface thereof, or may not reach the surface, thus imparting an untidy appearance to the wall or ceiling structure. It is therefore the principal object of the invention to provide a mounting for switch and outlet boxes by which the box may be accurately adjusted to present the open front of the box flush with the outer surface of a wall or ceiling after it has been attached to its support.

Another feature of the invention is to provide an attaching means for adjustably mounting an electrical switch or outlet box upon its support without sacrificing the fire protective characteristics of the box as specified by the fire underwriters.

A further feature of the invention resides in a bracket mounting for electrical switch and outlet boxes which may be fixedly attached in an initial approximate position upon its support, and subsequently adjusted to an arcuate final position without disturbing the attaching means.

Other features of the invention are to provide an adjustable bracket mounting for switch and outlet boxes which is simple and inexpensive of construction; easy to attach to a support; and easy and convenient to adjust when in mounted position.

Other novel features of the invention will become apparent as the following specification is read in conjunction with the accompanying drawing, in which, Figure 1 is a perspecitve view of an electrical switch box with my adjustable mounting associated therewith.

Figure 2 is a fragmentary vertical sectional view on the line 2—2 of Figure 1.

Figure 3 is a fragmentary horizontal sectional view on the line 3—3 of Figure 2.

Figure 4 is a detail horizontal sectional view through a wall structure showing the switch box in mounted position relative thereto.

Figure 5 is a perspective view of my adjustable mounting associated with a conventional electrical outlet box.

Figure 6 is a fragmentary vertical sectional view taken approximately on the line 6—6 of Figure 5.

Referring to the drawing by reference characters, and at present to the form of my invention illustrated in Figures 1 to 4 inclusive, the numeral 10 designates a conventional electrical metal switch box. The box 10 is rectangular in shape and open at its front. The box 10 includes flat opposed side walls 11—11, a bottom wall 12, top wall 13, and rear wall 14. One of the side walls 11 is provided with spaced parallel slots 15—15, the same being elongated in a forwardly and rearwardly direction.

Slidably supported by the slotted wall 11 of the box is an attaching and supporting bracket 16 constructed of a single length of flat bendable metal. The bracket 16 includes a body portion 17 of a length greater than the distance between the slots 15—15 and of a width less than the length of the slots. Integral with the ends of the body portion 17 and extending outwardly at right angle therefrom are flanges 18—18. Integral with the flanges 18—18 and extending in opposite directions are attaching ears 19—19, the same being parallel to the body portion 17 and outwardly offset relative thereto by the flanges 18—18. The corners of each ear 19 are bent outwardly to provide pointed prongs 20—20 which are driven into a wooden support to initially secure the bracket in position. Each ear 19 is provided with a nail opening 21 to facilitate the passage of a nail to effect a final attachment of the bracket to its support.

Freely passing through each slot 15 is a headed screw 22, the threaded shank of which threads into an opening 23 in the body portion 17 of the bracket. Whereas various types of screws 22 may be used, I prefer a screw having a square or hexagonal head 24 in addition to a key 25. By reason of the flat faced head of the screw I am able to insert a wrench through the open front of the box and impart the necessary turning movement to the screw to tighten or loosen the same. The box is of a size that prevents the insertion of a screw driver of a size sufficient to reach the kerfs of the screws for turning thereof.

In order to close the slots 15—15 at all times regardless of the adjusted position of the bracket 16 relative to the box 10, I provide a pair of metal shield or closure members 26—26 which are fixedly carried by the body portion 17 of the bracket. Each closure member 26 comprises a flat body portion 27 fitting against the body portion 17 of the bracket and secured thereto by rivets 28. The body portions 27 of the closure members are provided with threaded openings 23' which aline with the openings 23 to receive the threaded shanks of the screws 22. Integral with the ends of the body portion 27 are inwardly offset wing extensions 29—29 which closely parallel the slotted side wall 11. The wing extensions are provided with spaced weakened break away portions 30 which may be broken away by the blow of a hammer, should the adjustment of the bracket be such that portions of either of the ends of the closure members extends beyond the front or rear ends of the slotted side wall 11 when the box is mounted in position for use upon a support. The closure members 26 are of such length that the slots 15 are covered at all times to prevent sparks from escaping from the box when an electric switch is installed therein.

In Figure 4 of the drawing, I have illustrated the switch box 10 in mounted position upon a vertical 2″ x 4″ wooden column support A, which column support forms an anchorage for a wall B. It is customary when installing an electric lighting system in a new building, to fixedly secure the switch boxes in position before erecting the wall B. With the screws 22 unloosened, the prongs 20 of the bracket are driven into the support A at the desired height whereupon the bracket is in its initial stage of securement. Nails C are now driven through the openings 21 in the ears 19 to provide a firm positive attachment of the bracket to the support. After erection of the wall B, the electrician adjusts the box 10 by sliding it forward or rearward to a position where the open front of the box is flush with the outer surface of the wall B. The screws 22 are now turned to tightening position by turning them with the proper instrument, whereupon the box is secured against movement. When the switch installation is completed, an escutcheon or cover plate D is attached to the front of the box in the usual manner to close the same and conceal the joint between the wall of the box.

In Figure 5 of the drawing, I have illustrated my invention as applied to a conventional metal outlet box 30 having four side walls 31 and an end wall 32. One of the side walls 31 is provided with a pair of spaced parallel elongated slots 33—33 which extends in a direction transversely thereof. Carried by the slotted wall 31 is an attaching and supporting bracket 34 which comprises a single length of flat metal bent to provide a flat elongated body portion 35 which flatly engages the exterior of the slotted wall 31 and which is of a length approximating the length of said wall. Integral with the ends of the body portion 35 are outwardly extending right angle flanges 36—36 having oppositely extending flat ears 37—37 integral therewith. The ears 37—37 are parallel to the body portion 35 and have their corners bent outwardly to provide pointed prongs 38. The body portion 35 is provided with threaded openings 39—39 which register with the slots 33—33 to receive the threaded shanks of headed screws 40. The shanks of the screws freely pass through the slots 33 with their heads disposed within the outlet box. By loosening the screws 40, the outlet box 30 and bracket 34 may be slid relative to each other for adjustment relative to a ceiling or wall structure when the outlet box is installed for use. Initially, the prongs 38 are driven into a support, after which nails are driven therein through openings 41 in the ears 37. The ears 37—37 clear opposed walls 31 of the outlet box 30 so that there are no obstructions which might interfere with the hammering of the ears to drive the prongs into a support nor with the driving of nails through the openings 41. After the bracket 34 has been secured to a support, the outlet box 30 may be finally adjusted relative to a ceiling or wall structure and the same held in such position by tightening the screws 40.

Whereas the bracket 16 has been shown as mounted on the side wall 11 of the box 10, the same may be mounted on the top wall 13 if desired for suspending the switch box from a horizontal support.

While I have shown and described what I consider to be the preferred embodiments of my invention, I wish it to be understood that such changes in construction and design as come within the scope of the appended claims may be resorted to if desired without departing from the spirit of the invention.

Having thus described the invention, what I claim as new and desire to secure by Letters Patent of the United States is:

1. In combination, a metal electrical switch box open at its front and having a flat side wall, said side wall having spaced parallel slots therein which are elongated in a front to rear direction, a metal box-supporting bracket comprising a flat body portion of a width less than the length of said slots and flatly fitting against the exterior of said side wall in overlying relation to the slots and transversely thereof and having its ends extending beyond the respective slots, metal shield members carried by said body portion in overlying relation to said slots, each of said shield members being of a length to close the slot at all times within the range of sliding adjustment of the bracket, the end portions of each shield member having spaced weakened portions to facilitate the breaking off of the ends of the shield member should the same project beyond the plane of the front or rear of the box when in an adjusted installed position upon a support, outwardly offset attaching ears integral with the ends of the body portion and disposed parallel thereto, and screws freely passing through the slots and being threaded into threaded openings provided in said body portion, whereby said bracket may be adjusted forwardly and rearwardly relative to the side wall of the box to facilitate adjustment of the same during installation of the box in a wall structure.

2. In combination, an electrical switch box having a flat side wall, said side wall having a pair of spaced parallel elongated slots therein, a supporting bracket for said box adapted to be fixedly secured to a support including a flat body portion of a width less than the length of said slots and flatly fitting against the exterior of said side wall in overlying relation to the slots and transversely thereof, shield members fixedly carried by said body portion and having free flat end portions extending from the opposed side edges thereof in overlying relation to the respective slots, each of said shield members being of a length to close its related slot at all times within the range of sliding adjustment of the box relative to the bracket, and headed screws freely passing through the slots and threaded into threaded holes in said body portion.

3. In a combination as set forth in claim 2 in which the free end portions of each shield member has spaced weakened portions to facilitate the breaking off of the ends of the shield member should the same project beyond the plane of either of the ends of the box when in an adjusted installed position.

JACOB B. COOPER.